(12) United States Patent
Wang et al.

(10) Patent No.: US 10,313,482 B2
(45) Date of Patent: Jun. 4, 2019

(54) METHOD, DEVICE AND SYSTEM FOR PROVIDING SERVICES BASED ON LOCATION INFORMATION AND TERMINAL DEVICE THEREON

(71) Applicant: Samsung Electronics Co., Ltd., Gyeonggi-do (KR)

(72) Inventors: Wei Wang, Beijing (CN); Chunhua Wang, Beijing (CN); Fei Yang, Beijing (CN); Kun Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 149 days.

(21) Appl. No.: 14/515,672

(22) Filed: Oct. 16, 2014

(65) Prior Publication Data

US 2015/0106435 A1    Apr. 16, 2015

(30) Foreign Application Priority Data

Oct. 16, 2013  (CN) .......................... 2013 1 0484721

(51) Int. Cl.
*G06F 15/16* (2006.01)
*H04L 29/06* (2006.01)
*H04L 29/08* (2006.01)

(52) U.S. Cl.
CPC .............. *H04L 67/42* (2013.01); *H04L 67/18* (2013.01); *H04L 67/303* (2013.01)

(58) Field of Classification Search
CPC ......... H04W 4/02; H04W 4/021; H04W 4/08; H04L 67/18; H04L 41/5054
See application file for complete search history.

(56) References Cited

U.S. PATENT DOCUMENTS

| | | | | |
|---|---|---|---|---|
| 2004/0157620 A1* | 8/2004 | Nyu | ........................ | H04W 4/20 455/456.1 |
| 2005/0113123 A1* | 5/2005 | Torvinen | ................ | H04W 4/021 455/519 |
| 2006/0195365 A1* | 8/2006 | Karabetsos | .......... | G06Q 10/025 705/7.19 |
| 2006/0234687 A1* | 10/2006 | Patel | ..................... | H04W 88/14 455/414.2 |
| 2008/0227473 A1* | 9/2008 | Haney | ................... | H04L 12/08 455/457 |
| 2010/0069091 A1* | 3/2010 | El-Saidny | ............. | H04L 12/189 455/456.3 |
| 2011/0207440 A1* | 8/2011 | Ruuspakka | ............. | H04W 4/08 455/414.1 |

(Continued)

*Primary Examiner* — Mohamed Ibrahim
(74) *Attorney, Agent, or Firm* — The Farrell Law Firm, P.C.

(57) ABSTRACT

A method, device, terminal, and system for providing services based on location information are provided. The method includes acquiring location information of a client; retrieving attribute information of a group of the client when the client is located within a group service region; and providing a group service according to the attribute information of the group of the client. The device includes an acquisition module configured to acquire location information of a client; a retrieval module configured to retrieve attribute information of a group of the client when the client is located within a group service region; and a service provision module configured to provide a group service according to the attribute information of the group of the client.

18 Claims, 9 Drawing Sheets

(56) References Cited

U.S. PATENT DOCUMENTS

| | | | |
|---|---|---|---|
| 2011/0211693 A1* | 9/2011 | Carvalho | H04L 63/065 |
| | | | 380/200 |
| 2013/0091005 A1* | 4/2013 | Ryu | G06Q 30/0207 |
| | | | 705/14.36 |
| 2014/0006951 A1* | 1/2014 | Hunter | H04H 60/31 |
| | | | 715/719 |
| 2014/0046591 A1* | 2/2014 | Boldyrev | G01C 21/3438 |
| | | | 701/533 |

* cited by examiner

METHOD, DEVICE AND SYSTEM FOR PROVIDING SERVICES BASED ON LOCATION INFORMATION AND TERMINAL DEVICE THEREON

PRIORITY

This application claims priority under 35 U.S.C. § 119(a) to a Chinese Patent Application filed on Oct. 16, 2013 in the Chinese Intellectual Property Office and assigned Serial No. 201310484721.X, the contents of which are incorporated herein by reference.

BACKGROUND

1. Field of the Invention

The present invention relates generally to the technical field of location based services, and more particularly, to a method, device and system for providing services based on the location information and a terminal device thereon.

2. Description of the Related Art

Location Based Service (LBS) technology is an information technology integrating communication technology, Geographic Information System (GIS) technology, mobile localization technology, etc. The LBS technology has broad application prospect and high efficiency especially in aspects of positioning search, transportation navigation, mobile electronic commerce, emergency assistance in the ocean or desert, etc. It is predicted that revenues from services of the LBS technology will increase at the annual rate of 200%-300% around the world over the next several years. The LBS technology has tremendous business prospect.

The existing LBS technology has great potential for utilization. Many LBS service providers offer various services, for example, sign-in, search, information push positioning, etc., to clients via LBS servers. The clients of the LBS servers are scattered and independent from each other, all LBS service providers offer services to clients via particular software tools (i.e. an application or APP). For example, when a user must acquire outdoor sport service information provided by an outdoor sport information LBS service provider, the user first starts a software tool corresponding to the outdoor sport information LBS service provider in the client, and then acquires the outdoor sport service information from the outdoor sport information LBS service provider via an LBS server; and when the user must acquire another group-purchase service information provided by a group-purchase information LBS service provider, a communication terminal of the client will start a software tool corresponding to the group-purchase information LBS service provider. Therefore, the client must switch software tools frequently when acquiring different services, resulting in inconvenient and complicated operation. Meanwhile, an LBS service provider is unable to provide services which the client is interested in or demands only to a user based on the LBS technology, thereby resulting in poor pertinence and low efficiency when a client acquires services from the LBS service providers via the LBS server.

SUMMARY

The present invention was made to address the above-mentioned problems and disadvantages, and to provide at least the advantages described below. Accordingly, an aspect of the present invention provides a method for providing services based on location information, and a device, system, and terminal device based thereon.

In accordance with an aspect of the present invention, a method of providing services based on location information is provided. The method includes acquiring location information of a client; retrieving attribute information of a group of the client when the client is located within a group service region; and providing a group service according to the attribute information of the group of the client.

In accordance with another aspect of the present invention, a device for providing services based on location information is provided. The device includes an acquisition module configured to acquire location information of a client; a retrieval module configured to retrieve attribute information of a group of the client when the client is located within a group service region; and a service provision module configured to provide a group service according to the attribute information of the group of the client.

In accordance with another aspect of the present invention a terminal device is provided. The terminal device includes a sending module configured to send location information of a client to a device for providing services based on the location information; and a receiving module configured to receive group services provided by the device for providing services based on the location information according to attribution information of a group of the client, wherein, when the client is located within a group service region, the device for providing services based on the location information retrieves the attribution information of the group of the client.

In accordance with another aspect of the present invention a location information based service provision system is provided. The system includes a client, a Location Based Service (LBS) server, a gateway and an LBS service provider, wherein the LBS server includes a device for providing services based on location information, and the client includes a terminal device.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
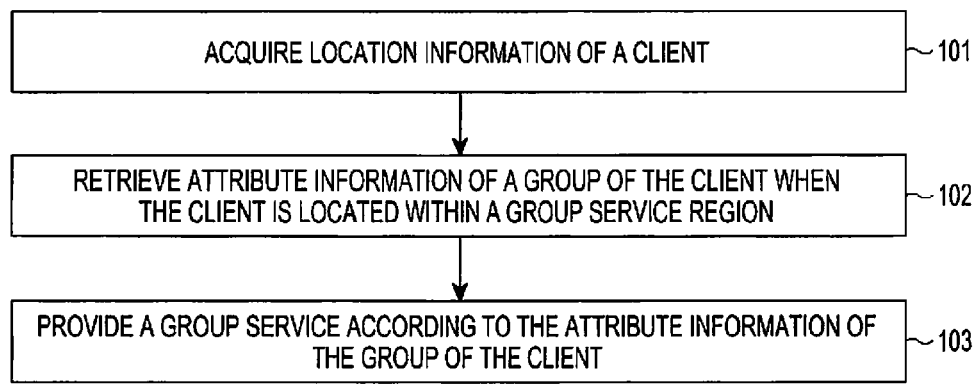
FIG. 1 is a flow chart of a method of providing services based on location information according to an embodiment of the present invention.

Embodiments of the present invention are described in detail hereinafter. The embodiments of the present invention are illustrated in the accompanying drawings, wherein similar or same numeral symbols indicate similar or same elements or elements with same or similar functions from beginning to end. The embodiments described below with reference to the accompanying drawings are intended to only explain the present invention and should not be construed as limiting the scope of the present invention.

It shall be understood by those skilled in the art that the singular forms "a", "an", "the", and "said" may be intended to include plural forms as well, unless the context clearly indicates otherwise. It should be further understood that the terms "comprises" and "comprising" specify the presence of stated features, integers, steps, operations, elements, and/or components, but do not preclude the presence or addition of one or more other features, integers, steps, operations, elements, components, and/or groups thereof. It should be understood that when a component is referred to as being "connected to" or "coupled to" another component, it can be directly connected or coupled to the other element or intervening elements may be present. In addition, the terms "connected to" or "coupled to" may also refer to a wireless connection or couple. As used herein, the term "and/or" includes any and all combinations of one or more of the associated listed items.

Unless otherwise defined, all terms (including technical and scientific terms) used herein have the same meaning as commonly understood by one of ordinary skill in the art to which the present invention belongs. It shall be further understood that terms, such as those defined in commonly used dictionaries, should be interpreted as having a meaning that is consistent with their meaning in the context of the relevant art and will not be interpreted in an idealized or overly formal sense unless expressly so defined herein.

Those skilled in the art will understand that the term "terminal", "client" and "terminal device" used herein encompasses not only devices with a wireless signal receiver having no emission capability but also devices with receiving and emitting hardware capable of carrying out bidirectional communication over the two-way communication link. These kinds of devices may include a cellular or other communication device with or without a multi-line display; a Personal Communication System (PCS) with combined functionalities of voice and data processing, facsimile and/or data communication capability; a Personal Digital Assistant (PDA) having a Radio Frequency (RF) receiver and a pager, an Internet network/intranet access, web browser, notepad, calendar and/or Global Positioning System (GPS) receiver; and/or a conventional laptop and/or palm computer or other devices having an RF receiver. The "terminal" and "terminal device" used herein may be portable, transportable, fixed on a transportation (aviation, maritime and/or terrestrial) or suitable for and/or configured to run locally and/or run in the form of distribution on the earth and/or other places in space. The "terminal" and "client" used herein may also refer to a communication terminal, Internet network terminal, music/video player terminal, for example, PDA, Multiple Interface Device (MID), and/or mobile phone with music/video play capabilities, and may also refer to a smart television, set top box, etc. "Base station", "base station equipment" and "server" refer to network equipment corresponding to "terminal", "client" and "target side".

An LBS service provider may be an enterprise user, a merchant user or a personal user, etc. They are registers or group owners of a location information based service group.

FIG. 1 is a flow chart of a method of providing services based on location information according to an embodiment of the present invention.

Referring to FIG. 1, the flow of the method of providing services based on location information in an embodiment of the present invention comprises the following steps.

In step 101, location information of a client is acquired.

In an embodiment of the present invention, a group service region is a specific region that may include schools, communities, markets, supermarkets, hospitals, enterprise factories or other regions. When a client enters a group service region, an LBS server will provide a group service to the client itself or a target side corresponding to the client. For example, the LBS server provides promotion information to a client entering a market as the group service region or, when a client enters and/or leaves a group service region, the LBS server will provide a group service to a target side corresponding to the client so that the target side may know the location of the client in real time, enable remote supervision of the client, and guard or rescue the client, thus ensuring the safety of the client. For example, if the client is a pupil, and the target side are the parents of the pupil, when the pupil enters a school as the group service region, the LBS server will send notification information to his/her parents.

In practice, the group service may include sign-in, promotional information of markets, target localization, social networking service or other services provided to clients in a group. The client may perform information interaction with the LBS server via a mobile terminal, an e-book or another communication terminal. In step 101, when a client enters a group service region, the LBS server will acquire location information of the client in the group service region or the LBS server will acquire location information of the client in the group service region according to location information associated with information provided by the client. After the LBS server has acquired the location information, the process proceeds to step 102.

In step 102, attribution information of a group of the client is retrieved when the client is located within a group service region.

In an embodiment of the present invention, both the communication terminal of the client and the LBS server may include a software tool for providing location based group services. The software tool integrates services provided by a plurality of LBS service providers. The software tool for providing the group service is referred to as a group software tool and is compatible with services provided by various LBS service providers. The client and the LBS server may receive different services from different LBS service providers via the group software tool. A client may receive the service provided by the LBS service provider corresponding to the group only as long as it is joined to a group in the group software tool. There is more than one group in the group software tool. Each group comprises more than one client and corresponds to the service provided by one LBS service provider. After registering to a group in which the client is interested in the group software tool, the client receives the service provided by the LBS service provider corresponding to the group.

After registering, or logging, in one group in the group software tool, the client only receives the service provided by the LBS service provider corresponding to the group, so that multiple groups logged by the client in the group software tool can receive services provided by multiple LBS service providers, instead of having to start different software tools to receive services from different LBS service providers as in the related art, thus the inconvenient operation of frequently switching between different software tools in the related art is avoided. Thus, a client can receive the service provided by an LBS service provider corresponding to a group only by registering to the group corresponding to the required service and becoming a member thereof. The operation is very simple and convenient.

In practice, information about the group of the client is stored in the LBS server. Clients with common interests, common demands or common permissions to form a group so that each of the clients in the group may receive group services sent by the LBS server, thus the blindness in providing service via the LBS server is decreased, and the efficiency and pertinence in providing service via the LBS server are improved. The clients in the group may perform information interaction with each other, in order to meet the demand of information exchange and discussion between all clients in the group and to improve the user experience of the clients.

In step 102, when a client enters a group service region, and if the client has started a group software tool for providing the group service and has sent a login request to the LBS server, the LBS server will activate the client in the group of the client and retrieve attribution information of the group of the client. In practice, when a client enters a group service region, the LBS server activates the client in the group of the client automatically; alternatively, when a client enters a group service region, the LBS server will inform the client to log into the group of the client in order to remind the client to send a login request to the LBS server. After receiving the login request of the client, the LBS server activates the client in the group of the client in order to make the client log into the group, and then retrieves attribution information of the group of the client. Then, the process proceeds to step 103.

In step, 103, a group service is provided to the client according to the attribution information of the group of the client.

In step 103, the LBS server provides a group service to the client according to the attribution information of the group of the client. The attribution information comprises information such as the LBS service provider who offers services to the group, the type of the service provided to the client, the service frequency and/or the service time. For example, when a client enters a market as the group service region, the LBS server will send promotional information, information about new goods ready for sale, group-purchase information or other information to the client.

In an embodiment of the present invention, after the LBS server has acquired the location information of the client and when the client is located within the group service region, the LBS server retrieves the attribution information of the group of the client, and then provides a group service according to the attribution information of the group of the client. It is ensured that a client receives the group service which the client is interested in or demands only within the group service region. Consequently, the pertinence and efficiency of the LBS server for providing the group service to clients or target sides are improved. A client may receive different group services after logging into different groups, so that it is convenient and fast for a client to acquire group services and the user experience of a user is greatly improved.

Figure 2:
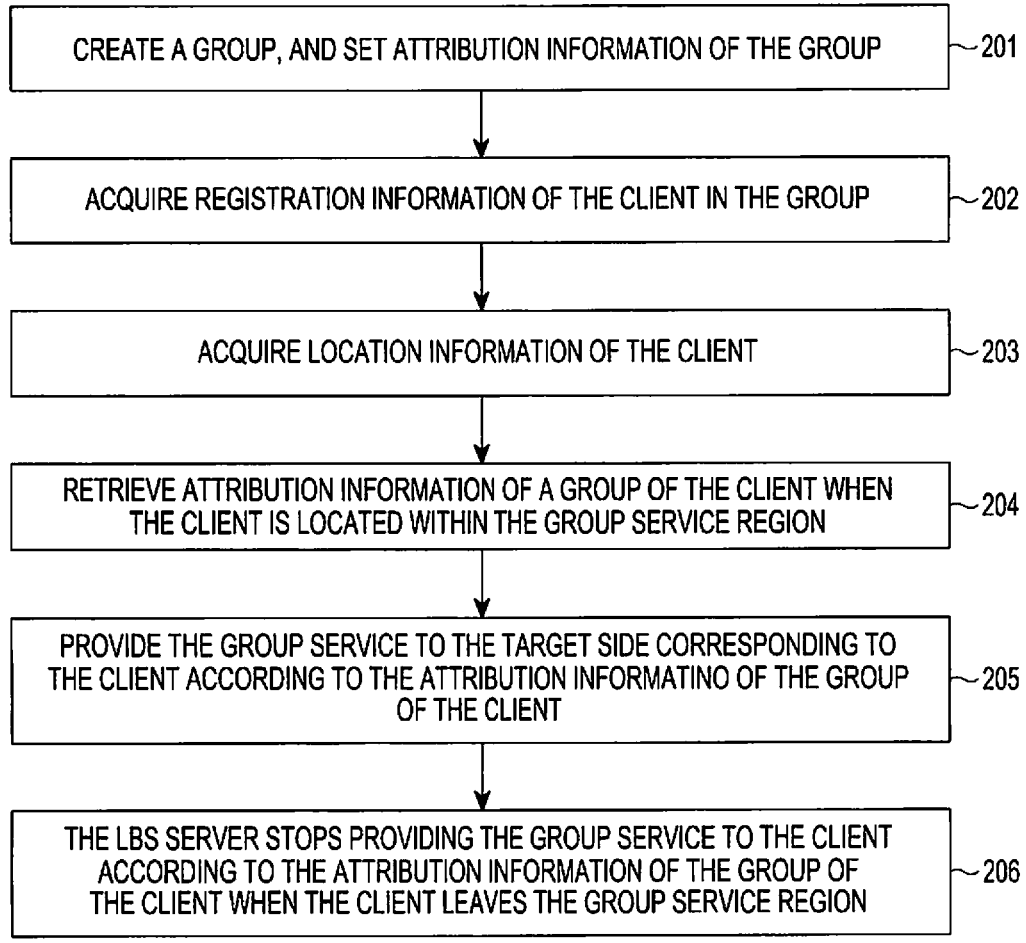
FIG. 2 is a flow chart of a method of providing services based on location information according to an embodiment of the present invention.
Figure 3:
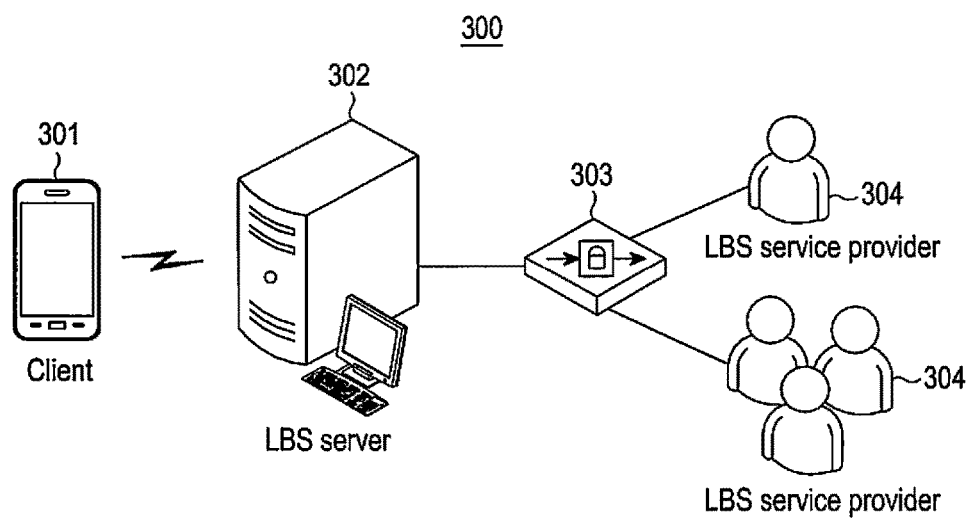
FIG. 3 is a schematic diagram of a system for providing a location information based service according to an embodiment of the present invention.

FIG. 2 is a flow chart of a method of providing services based on location information according to an embodiment of the present invention, and FIG. 3 is a schematic diagram of a system for providing location information based service in an embodiment of the present invention.

Referring to FIG. 2, the flow of the method of providing services based on the location information in an embodiment of the present invention comprises the following steps.

In step 201, a group is created, and attribution information of the group is set.

Referring to FIG. 3, a system 300 for providing location information based service in an embodiment of the present invention comprises a client 301, an LBS server 302, a security gateway 303 and at least one LBS service provider 304. Both the client 301 and the LBS server 302 include a group software tool. The client 301 and the LBS server 302 may perform information interaction by any one of the following communication networks: General Packet Radio service (GPRS), Wideband Local Area Network (WLAN), Third Generation (3G) communication network, Fourth Generation (4G) communication network, etc. An LBS service provider 304 may be an enterprise user, a merchant user or a personal user, etc. In step 201, an LBS service provider 304 or the client may create a group in the group software tool in the LBS server 302 and set the attribution information of the created group. Setting attribution information of the group comprises at least one of the following: setting cancellation rules of the group; setting qualification and rating of clients in the group; and setting service items and charge or not of the service items in the group. The cancellation rules of the group comprise at least one of the following rules: the group reaches a preset cancellation time; the credit rating of the group is lower than a threshold value; the number of users in the group is lower than a threshold value, and the creator cancels the group actively.

After the LBS service provider or the client has created a group and has set the attribution information of the group, the process proceeds to step 202.

In step 202, registration information of the client in the group is acquired.

In step 202, when a client is interested in joining a group, the client will initially complete, or fill out, registration information in the group software tool and then send it to the LBS server. After the LBS server has acquired the registration information of the client in a group, the LBS server verifies whether the registration information accords with the preset standards and, if so, allows the client to join in the corresponding group. As a member of the group, the client receives group services provided by the LBS server. When a client enters a group service region, the process proceeds to step 203.

In practice, a client may submit the registration information to the LBS server from any location. The registration information comprises the location covered by an expected group service region, identity authentication information of the client, etc. The LBS server sets the type of group according to different information provided by the client joining the group. For example, the type of group may comprise an ordinary group, a private group, etc. If the client wants to join an ordinary group, the client need only provide its own location information, attribution information of the group the client wants to join, etc. If the client wants to join a private group, the client must provide its own location information, information of a presenter, name or IDentification (ID) of the group, etc. The group services provided by the LBS server are finally provided by the LBS service providers. The LBS service providers may customize the attribution of a group service flexibly. For example, a client may be required to pay when registering with a group.

In step 203 location information of the client is acquired.

In step 203, when a client enters a group service region, the LBS server acquires the location information of the client in the group service region. Then, the process proceeds to step 204.

In practice, when a client enters a group service region, the communication terminal of the client sends the location information thereof to the LBS server actively, so that the LBS server can acquire the location information of the client; or the location information of the client is detected by the positioning function of a Geographic Information System (GIS) or Global Positioning System (GPS). When a client enters a group service region, the GIS or GPS will send the location information of the client to the LBS server automatically, so that the LBS server can learn the location information of the client in real time.

In step 204, attribution information of a group of the client is received when the client is located within the group service region.

In step 204, when a client enters a group service region, and if the client has started a group software tool that is configured to provide the group service and has sent a login request to the LBS server, the LBS server will activate the client in the group of the client in order to make the client log into the group, and then retrieve the attribution information of the group of the client.

In practice, when a client enters a group service region, the LBS server activates the client in the group of the client automatically; alternatively, when a client enters a group service region, the LBS server will inform the client to log into the group of the client in order to remind the client to send a login request to the LBS server. After the LBS server receives the login request of the client, the LBS server activates the client in the group of the client in order to make the client log into the group, and then retrieves the attribution information of the group of the client. Then, the process proceeds to step 205.

In step 205, a group service to the target side corresponding to the client is provided according to the attribution information of the group of the client.

In step 205, the LBS server provides a group service to the target side corresponding to the client according to the attribution information of the group of the client. For example, when a client enters and/or leaves a group service region, notification information is sent to the target side in order to inform the location information of the client to the target side and inform the target side of the location of the client, including sign-in, medical rescue, positioning search, etc. After the client leaves the group service region, the process proceeds to step 206.

In step 206, when the client leaves the group service region, the LBS server will no longer provide the group service to the client according to the attribution information of the group of the client.

In step 206, when a client leaves a group service region, the LBS server stops providing the group service according to the attribution information of the group of the client. For example, when a user enters a market as the group service region, the LBS server will send information about the market to the client, including promotional information, information about new goods ready for sale or group-purchase information, etc. When a user leaves a market as the group service region, the LBS server will no longer send the above information about the market to the client. Therefore, the load of the LBS server is lowered, and the pertinence in providing the group service is improved.

In practices, when the LBS server has not received the location information of a client within a preset time, the LBS server will stop providing the group service to the client in order to avoid a situation where the client is required to log into the group when entering or leaving the group service region, so that the load of the LBS server is lowered.

For example, a merchant may register to apply for a group for a supermarket. A consumer may search for the group of the supermarket after starting the group software tool when entering the supermarket. After joining the group, the consumer may receive the promotional information, electronic coupons, ratings, requests to try on clothes, the number of consumers at the cashier desks and other information about the supermarket. For example, when a consumer has received a mobile coupon, the consumer may show the received electronic coupon to the cashier to remit part of the payment. If a client often visits this supermarket, the client may, for example, collect the group of the supermarket to conveniently log into the group.

In practice, when entering a group for trade of second-hand goods, the client may issue trade information and trade its own second-hand goods, which provides convenience to the client and other clients nearby to perform offline trading. In another case, when a client needs a car, the client may choose to create a temporary group for car sharing service, and register a temporary group for car sharing service lasting 1.5 hours, thus clients nearby may search for this temporary group automatically. If there are clients willing to join in the temporary group, they may apply to join in the temporary group. Other clients may join in the temporary group at will, or may be allowed by the creator of the temporary group to join in the temporary group. The clients in the temporary group may view each other's actual location, expected location, estimated possible waiting time and tolerance time of the client, thus making it convenient for car sharing.

In another case, before a meeting, a meeting organizer or initiator may create an automatic sign-in group for a meeting room in advance. At the specified time of the meeting, the group is activated automatically. When a client in the group enters a designated location, the group will perform automatic counting and real-time sign-in. The organizer may view information about the attendance of participants, and may learn in real time the information about the attendance, and absence, of the participants in the meeting room. Furthermore, the organizer may also further issue topics, meeting process and other information according to the information about the attendance of the participants. In the group, the behavior of the members may be traced in real time during the meeting. For example, a certain participant leaving the meeting room during the meeting may be recorded. After the meeting ends, the group will automatically perform statistics on the information about the attendance of each of the participants, including the number of times and duration of leaving during the meeting, etc., and will automatically generate statistical data. The group will automatically become invalid (e.g. cease to exist) upon the end of the meeting. Meanwhile, during the meeting, the creator of the group may assign operational behaviors for the participants. For example, the participants may raise questions, make comments, ask for leave in the group, and so on. It is easy to expand the above application function to the sign-in in a company, to replace punching in and out.

In an embodiment of the present invention, the LBS server initially only receives the location information of a client. If the client is located within a group service region, the LBS server will retrieve the attribute information of a group of the client, and then provide a group service to the client according to the attribute information of the group of the client. It is ensured that the client receives a group service which the client is interested in or demands only within the group service region. Consequently, the pertinence and efficiency of the LBS server for providing the group service to a client or target side are improved. The client may receive different group services after logging into different groups, so that it is convenient and fast for a client to acquire group services and the user experience of a user is greatly improved.

Figure 4:
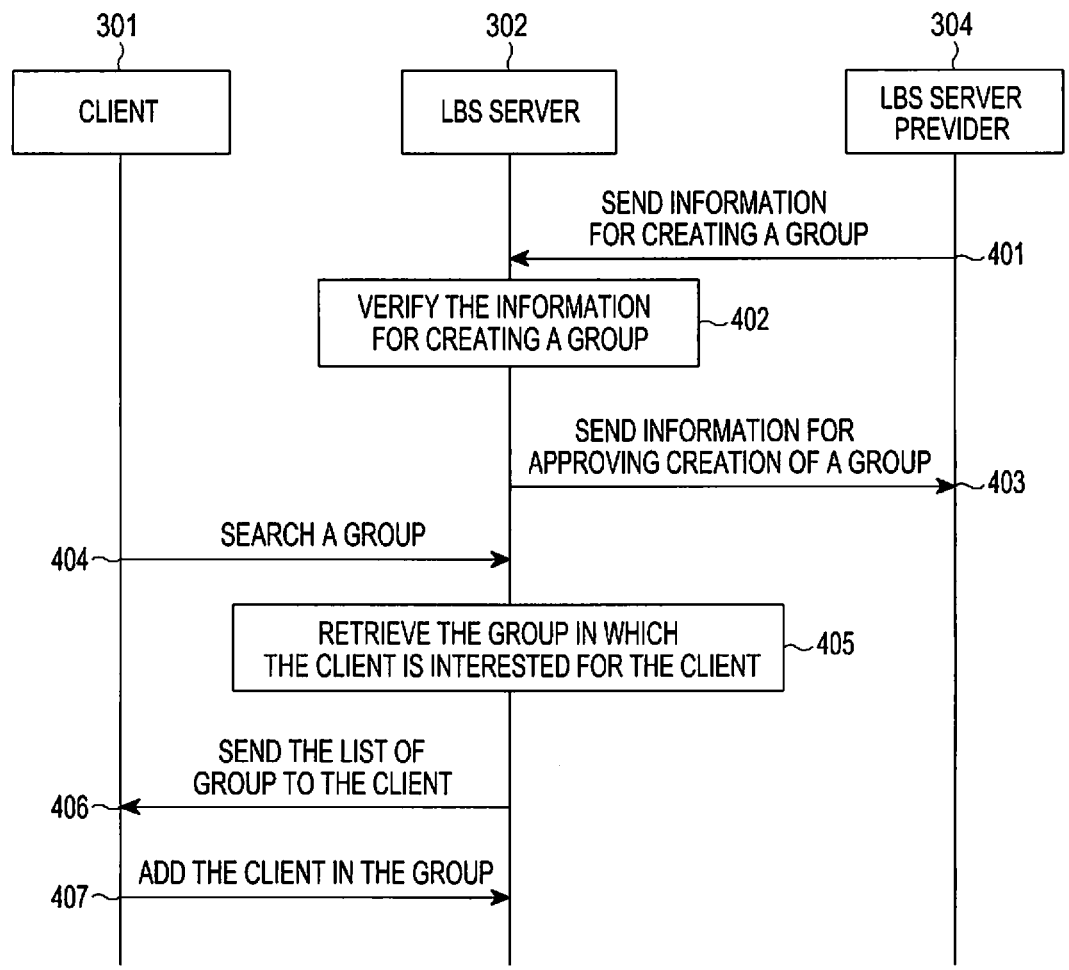
FIG. 4 is a flow chart of a method of creating a group according to an embodiment of the present invention.

FIG. 4 is a flow chart of a method of creating a group for providing services based on location information according to an embodiment of the present invention. As shown in FIG. 4, the flow of creating a group in an embodiment of the present invention comprises the following steps.

In step 401, information for creating a group is sent.

In step 401, an LBS service provider sends various registration information for creating a group to an LBS server, including sending attribute information of the group to the LBS server, wherein the attribute information comprises one or more of the following: security information of the group, function of the group, service region of the group, effective time, cancellation time, qualification and credit rating of the LBS service provider and other contents. In practice, both a client and an LBS server are provided with a group software tool that may integrate services provided by multiple LBS service providers. An LBS service provider may set a group via the group software tool, while a client may download and install the group software tool and then register to a required group via the group software tool. After the LBS service provider creates a group in the LBS server, the process proceeds to step 402.

In step 402, the information for creating a group is verified.

In step 402, the LBS server verifies the information for creating a group sent by the LBS service provider. If the validation fails, the LBS server sends information about a refusal to create a group to the LBS service provider. If the validation succeeds, a group is created in the LBS server. Then, the process proceeds to step 403.

In step 403, information for approving the creation of a group is sent.

In step 403, the LBS server sends information about approving the creation of a group to the LBS service provider, and also sends the name, ID and other information of the group to the LBS service provider. The LBS service provider issues a group service to the LBS server via the group, and then the LBS server provides information about the group to clients in the corresponding group. When a client searches for the group via the group software tool installed in the client, the process proceeds to step 404.

In step 404, a group in which the client is interested is searched for, for the client.

In step 404, a client initially starts its own group software tool to acquire information about the current location of the client, and then starts the group searching function in a group chat tool to search for a group in which the client is interested via the LBS server. In this case, the client must send the location of the client, ID number of a group to be searched, functions of the group to be searched and other information to the LBS server. Then, the process proceeds to step 405.

In step 405, the group in which the client is interested is retrieved for the client.

In step 405, after acquiring the location of the client and the ID number, functions or service items of the group to be searched, the LBS server retrieves one or more of the groups in which the client is interested for the client according to the information mentioned above and generates a list of groups. Then, the process proceeds to step 406.

In step 406, the list of groups is sent to the client.

In step 406, the LBS server sends the list of groups to the client via a communication network. After the client has received the list of groups, the process proceeds to step 407.

In step 407, the client is added to the group.

In step 407, after receiving the list of groups, a user selects an expected group from the list of groups. After the client joins the group, the group software tool in the client will present all clients in the group, or present each of clients in an active state in the group. After joining the group, the client receives group services provided by the LBS server, including broadcast information, etc. Meanwhile, the clients in the group may perform information interaction with each other, for example, chatting, sharing pictures or videos, viewing the location information of other clients and the number of all clients in the group, etc., so that the user experience of clients is improved.

Figure 5:
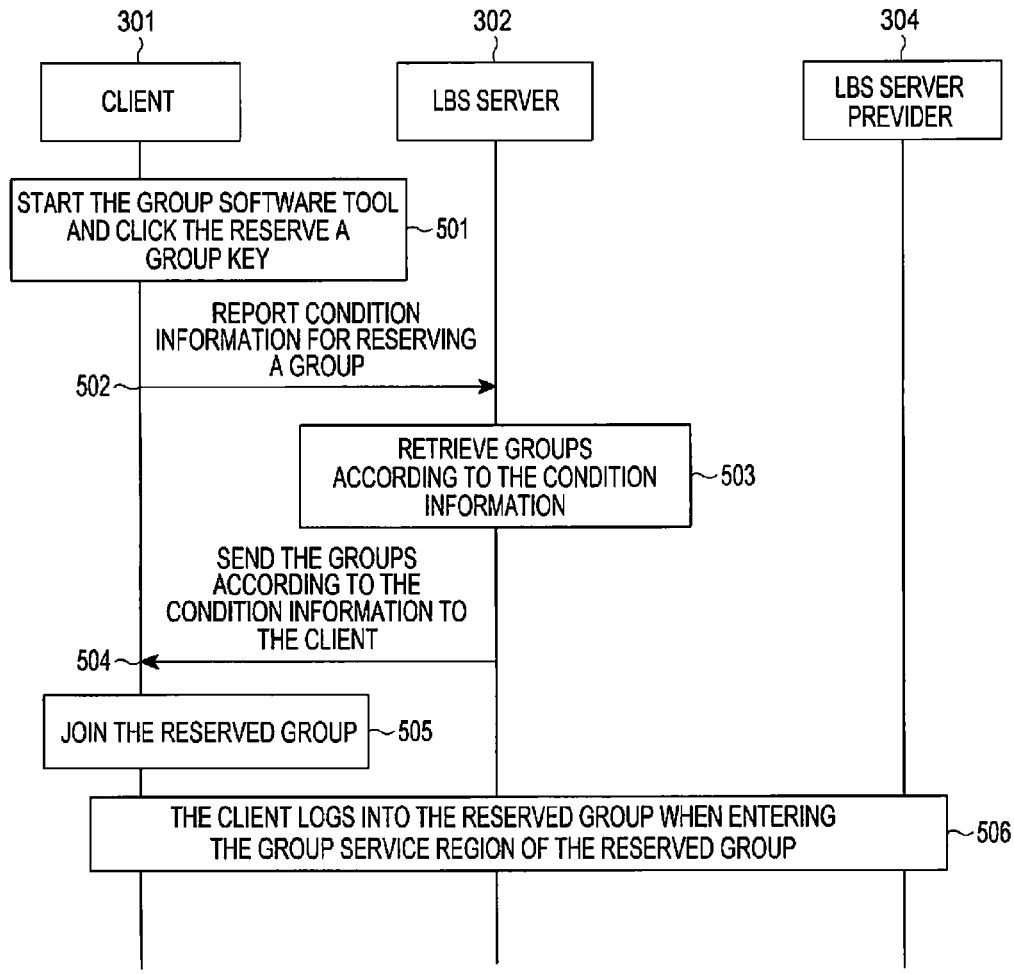
FIG. 5 is a flow chart of a method of subscribing to a group according to an embodiment of the present invention.

FIG. 5 is a flow chart of a method of subscribing to a group according to an embodiment of the present invention.

Referring to FIG. 5, the flow of subscribing a group in an embodiment of the present invention comprises the following steps.

In step 501, the group software tool is started and a "RESERVE A GROUP" key is clicked.

In an embodiment of the present invention, a client may join in an expected group in a way of subscribing to a group. In step 501, when the client must reserve a group, the client will initially start the group software tool, and then click on the "RESERVE A GROUP" key in the group software tool. Then, the process proceeds to step 502.

In step 502, condition information for subscribing to a group is reported.

In an embodiment of the present invention, the condition information for subscribing to a group includes the location region of a group to be reserved, functions or service items of a group to be reserved and other information. In step 502, the client reports the condition information for subscribing to a group to the LBS server. Then, the process proceeds to step 503.

In step 503, groups according to the condition information are retrieved.

In step 503, after acquiring the condition information for subscribing to a group, the LBS server retrieves one or more groups according to the condition information for subscribing to a group, and generates a list of groups. Then, process proceeds to step 504.

In step 504, the groups according to the condition information are sent to the client.

In step 504, the LBS server sends the list of groups to the client. The list of groups contains one or more groups according to the condition information of subscription. After the groups according to the condition information are sent to the client, the process proceeds to step 505.

In step 505, the reserved group is joined.

In step 505, the user receives the list of groups and then selects an expected reserved group from the list of groups. After the client joins in the reserved group, the process proceeds to step 506.

In step 506, the client logs into the reserved group upon entering the group service region of the reserved group.

After the client joins the reserved group, when entering the group service region of the reserved group, the client will log into the reserved group, or the account of the client will be activated. Then, the client receives group services provided by the LBS server, including broadcast information, etc. Meanwhile, all clients in the group may perform information interaction with each other.

Figure 6:
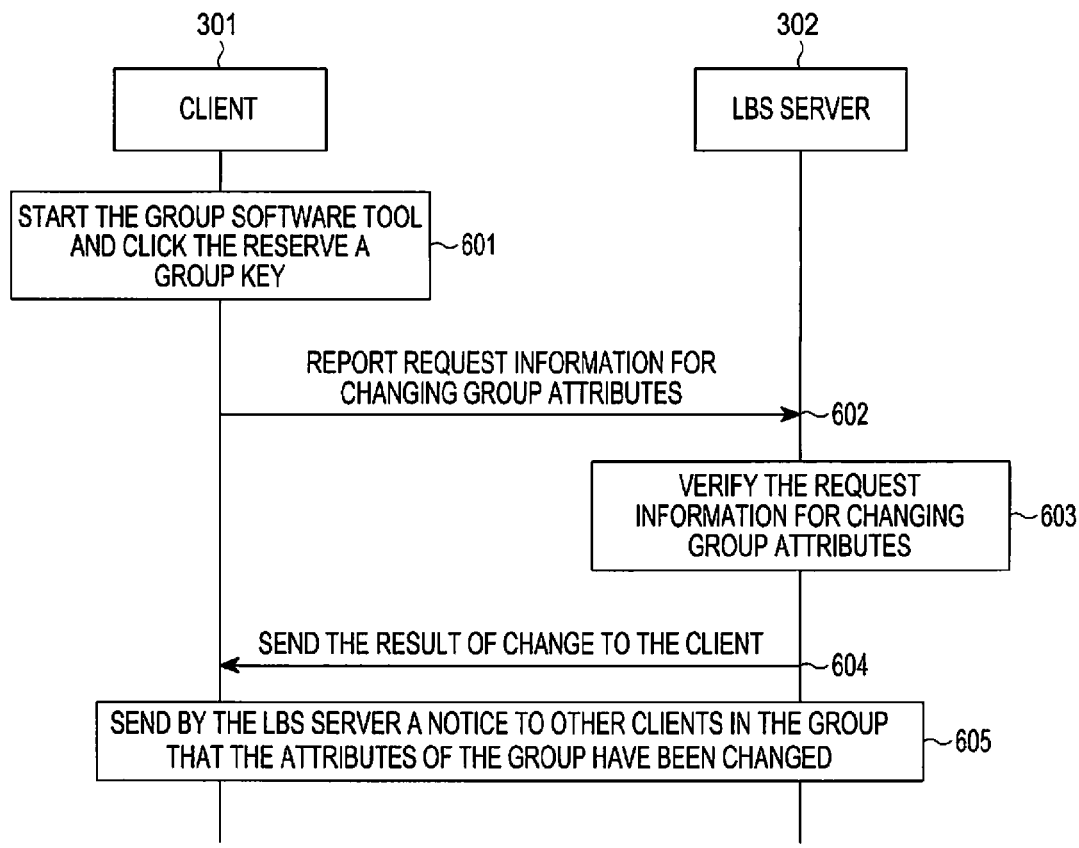
FIG. 6 is a flow chart of a method of changing group attributes according to an embodiment of the invention.

FIG. 6 is a flow chart of a method of changing group attributes according to an embodiment of the present invention.

Referring to FIG. 6, the flow of changing group attributes in an embodiment of the present invention comprises the following steps.

In step 601, the group software tool is started, and the "CHANGE GROUP ATTRIBUTES" key is clicked.

In an embodiment of the present invention, by changing group attributes, the number of members in a group may be expanded, the inactive members may be deleted, or the quality of group services may be improved. In an embodiment of the present invention, the technical solution will be introduced by using deleting inactive members as example. If a client wants to change attributes of the group, the client initially starts the group software tool, then logs into the group, and clicks the "CHANGE GROUP ATTRIBUTES" key in the group software tool. Then, the process proceeds to step 602.

In step 602, a request to change group attributes is reported.

In this step, the client sends a request to change group attributes to the LBS server. Generally, the permission to change group attributes may be granted to some clients, for example, the client who created the group. After the LBS server has received the request to change group attributes, the process proceeds to step 603.

In step 603, the request to change group attributes is verified.

In step 603, the LBS server analyzes contents in the request. The request to change group attributes includes the initial attribute information and new attribute information of the group, credit rating of the group, the number of login times and the login time of each client in the group, etc.

In an embodiment of the present invention, if the credit rating of the group is lower than a threshold value, or the number of login times of each client in the group is lower than a threshold value, or the login time of each client in the group is lower than a threshold value, the LBS server changes the attribute information of the group to new attribute information by verifying the request to change the group attributes. Then, the process proceeds to step 604.

In step 604, the result of a change to the group attributes is sent to the client.

In step 604, the LBS server sends the result of the change to the group attributes to the client putting forward the request to change group attributes so that the client can confirm the result of the change. Then, the process proceeds to step 605.

In step 605, a notice to other clients in the group that the attributes of the group have been changed is sent by the LBS server.

In step 605, the LBS server sends a notice to other clients in the group that the attributes of the group have been changed in order to inform the clients in the group that the attributes of the group have been changed, including information that inactive clients have been deleted, etc.

Figure 7:
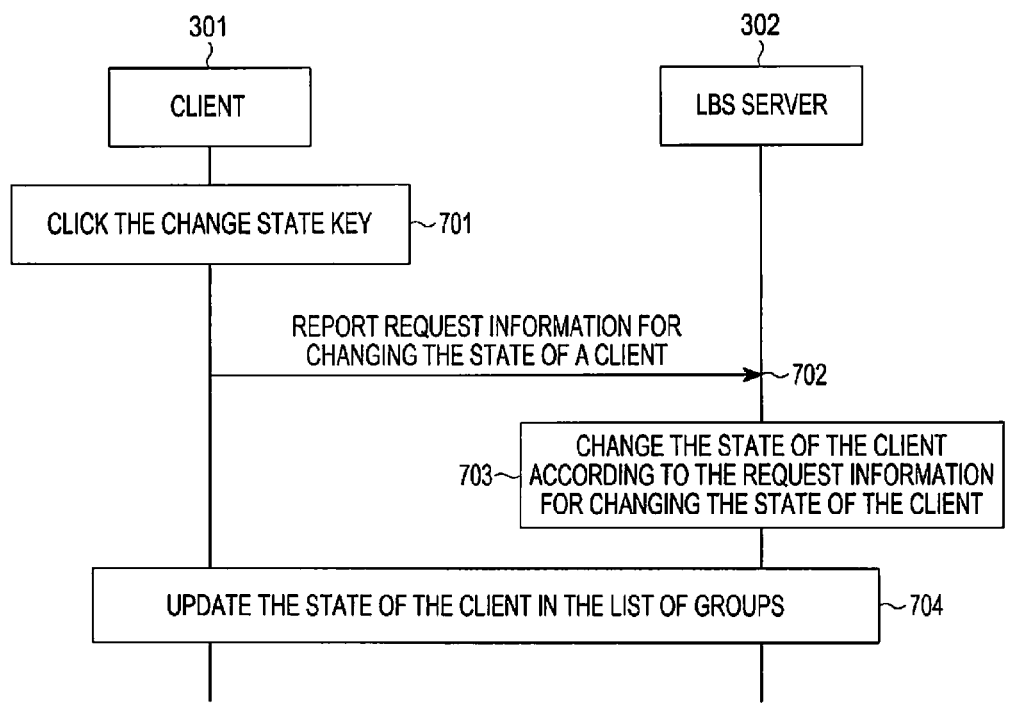
FIG. 7 is a flow chart of a method of changing a state of a client according to an embodiment of the present invention.

FIG. 7 is a flow chart of a method of changing the state of a client according to an embodiment of the present invention.

Referring to FIG. 7, the flow of changing the state (e.g. login state) of a client in the an embodiment of the present invention comprises the following steps.

In step 701, the "CHANGE STATE" key is clicked.

In an embodiment of the present invention, the state of a client comprises Active, Inactive and Cloaked, etc. When a client is active, the client may send a request to the LBS server to change the active state into inactive state or cloaked state. Each client in the active state will appear in an active list in the group, each client in the inactive state will appear in an inactive list in the group, and each client in the Cloaked state will appear in a cloaked list in the group. In an embodiment of the present invention, the technical solution will be exemplified by using changing a client from an active state to a Cloaked state as an example. The user logs into the group in the group software tool via a mobile terminal.

In step 701, when a client wants to change from the Active state to a Cloaked state, the client clicks the "CHANGE STATE" key in the group software tool. Then, the process proceeds to step 702.

In step 702, a request to change the state of a client is reported.

In step 702, the client sends the request to change the state of the client to the LBS server. After the LBS server has received the request, the process proceeds to step 703.

In step 703, the state of the client is changed according to the request to change the state of the client.

In step 703, after receiving the request to change the state of the client, if parsing the request indicates that the client is requesting to change into the Cloaked state, the LBS server changes the state of the client into the Cloaked state from the active state, and shifts the client into the Cloaked list from the active list. When the client is in the Cloaked state, other clients in the group are unable to see the location information of the client. After the state of the client is changed according to the request to change the state of the client, the process proceeds to step 704.

In step 704, the state of the client updated in the list of groups.

In step 704, the LBS server updates the state of the client in the list of groups in real time, so that the client and other clients may learn the state of the client in real time.

In practice, if a client is changed from the Active state to the Inactive state, the LBS server will shift the client into the inactive list from the active list. Meanwhile, the LBS server will inform other clients of the changed login state of the client.

The clients in a group within a group service region may be entitled to join the group to acquire group services, for example, receiving information only issued by the group, viewing real-time location information of other clients in the group or messages left by other clients or the login state of other clients, etc. When a client leaves the group service region, information about the client will not be displayed in the group. For example, the location information of the client will not be displayed after the client leaves the group. The members beyond the group service region are not entitled to enjoy many operations provided by the group. For example, they are unable to communicate, upload pictures, and receive real-time broadcast information in the group, etc. To distinguish whether a client is located within a group location region, the users within the group service region may be set in the Active state, while the users beyond the group service region may be set in the Inactive state. The number of clients in the Active state currently and the number of all clients in the group may be displayed. Whether or not a client stays in the Active state may be determined by the client itself.

In an embodiment of the present invention, by a location based service group, it is more convenient for an LBS service provider to customize services of much pertinence, and a client may choose to join different groups to acquire corresponding group services according to requirements. Because of the openness of the LBS server, providing group services will bring users in a group a new experience and also rich application scenes. The business prospects of the LBS service providers are expanded. Furthermore, by setting the cancellation time of a group, a temporary group may be provided to a user, so that any client may create a group within a group service region at any time and any place, and other clients within the group service region may search the temporary group automatically and choose to join the temporary group. The creator of a temporary group may define operation behaviors of other clients in the group, and may also upgrade the operation behaviors, permissions or credit ratings of some clients according to the operating condition of the temporary group. The clients in the group may enjoy different group services within the group service region according to the permissions or credit ratings.

In practice, groups may be divided according to the interests of the clients, for example, music, football, basketball, cooking or shopping, etc. Groups may also be created according to the organization of clients, for example, companies, schools, communities or hospitals, etc. Groups may also be divided according to security attributes. For example, the clients in the group may acquire group services in a public, semi-public or private way according to the requirements of clients. The division of security attributes may be applied by clients, and then verified and confirmed by the creator or administrator of the group. Further, groups may be divided according to the functions of the groups. For example, the second-hand trade, house lease and/or house tenancy may be performed in a group. Groups may also be divided according to the rating of Quality of Service (QoS). Furthermore, a group may be further divided into small groups. For example, a primary group may be divided into one or more secondary groups according to different interests, and the secondary groups may be divided into tertiary groups according to different organizations or security attributes, in order to further improve the pertinence and efficiency of group services.

Figure 8:
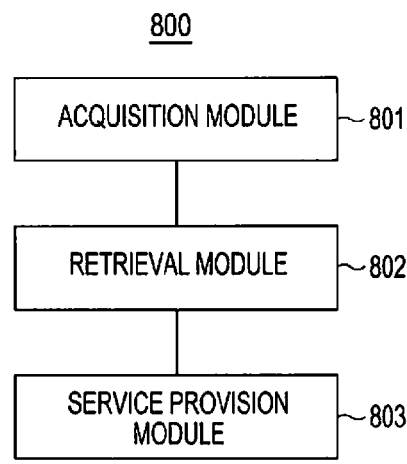
FIG. 8 is a block diagram of a device for providing services based on the location information according to an embodiment of the present invention.

FIG. 8 is a block diagram of a device 800 for providing services based on location information according to an embodiment of the present invention.

Referring to FIG. 8, the device 800 for providing services based on location information in an embodiment of the present invention comprises an acquisition module 801, a retrieval module 802 and a service provision module 803, wherein the acquisition module 801 is configured to acquire location information of a client; the retrieval module 802 is configured to retrieve attribute information of a group of the client when the client is located within a group service region; and the service provision module 803 is configured to provide a group service according to the attribute information of the group of the client. The acquisition module 801, the retrieval module 802 and the service provision module 803 may be disposed in an LBS server so that the LBS server has functions of all of the above modules.

In practice, the service provision module 803 provides a group service corresponding to the attribute information of the group to the client according to the attribute information of the group of the client. Further, according to the attribute information of the group of the client, the service provision module 803 provides a group service corresponding to the attribute information of the group to a target side corresponding to the client. For example, when a client enters and/or leaves a group service region, the service provision module 803 sends notification information to the target side. Further, when the client is located within the group service region, the service provision module 803 provides a service of enabling information interaction between the clients in the group. Further, when the client is beyond the group service region, the service provision module 803 will stop providing the group service to the client.

In an embodiment of the present invention, the acquisition module 801 initially acquires the location information of a client. Then, the retrieval module 802 retrieves attribute information of a group of the client when the client is located within the group service region. Finally, the service provision module 803 provides a group service to the client according to the attribute information of the group of the client. It is ensured that a client receives a group service which the client is interested in or demands only within the group service region. Consequently, the pertinence and efficiency of the LBS server for providing the group service to a client or target side are improved. The client may receive different group services after logging into different groups, so that it is convenient and fast for a client to acquire group services and the user experience of a user is greatly improved.

Figure 9:
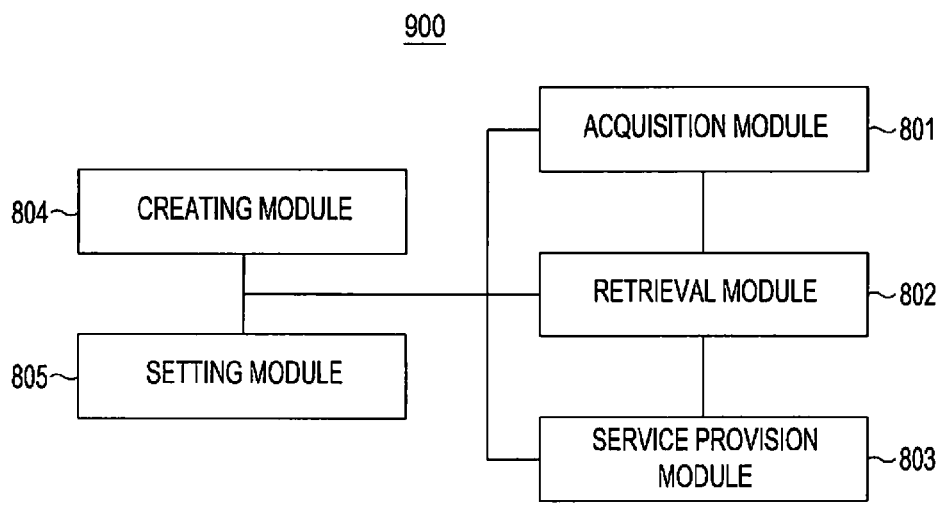
FIG. 9 is a block diagram of a device for providing services based on the location information according to an embodiment of the present invention.

FIG. 9 is a block diagram of a device 900 for providing services based on location information according to an embodiment of the present invention.

Referring to FIG. 9, the device 900 for providing services based on location information of FIG. 8 further comprises a creating module 804 and a setting module 805, wherein the creating module 804 is configured to create a group, and the setting module 805 is configured to set attribution information of the group. The acquisition module 801 is further configured to acquire registration information for joining a group.

Further, setting the group information by the setting module 805 comprises at least one of the following: setting cancellation rules of the group; setting qualifications of clients in the group; and setting service items in the group, etc.

Figure 10:
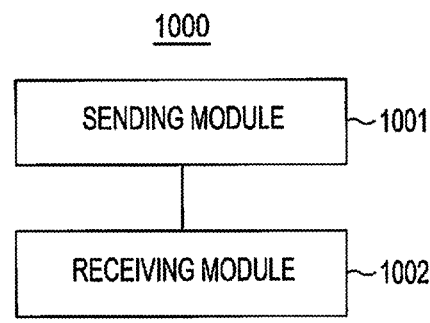
FIG. 10 is a block diagram of a terminal device according to an embodiment of the present invention.

FIG. 10 is a block diagram of a terminal device 1000 in an embodiment of the present invention.

Referring to FIG. 10, the terminal device 1000 in an embodiment of the present invention comprises a sending module 1001 and a receiving module 1002, wherein the sending module 1001 is configured to send location information of a client to a device for providing services based on location information, or sending the information associated with the location information to a device for providing services based on the location information, so that the device for providing services based on the location information acquires the location information of the client. The receiving module 1002 is configured to receive group services provided by a device for providing services based on the location information according to the attribution information of the group of the client. The attribute information comprises information such as the LBS service provider providing services to the group, the type of the service provided to the client, the service frequency and/or the service time. For example, when a client enters a market as the group service region, the LBS server will send promotional information, information about new goods ready for sale, group-purchase information or other information to the client.

Further, the sending module 1001 is further configured to send registration information for joining a group to the device for providing services based on the location information. After the LBS server has acquired the registration information for joining a group, the LBS server verifies whether the registration information accords with the preset standards, if so, allows the client to join the corresponding group. As a member of the group, the client receives group services provided by the LBS server.

In an embodiment of the present invention, the structure of the device for providing services based on location information may refer to FIG. 8 or FIG. 9. In practice, the functions of the device for providing services based on the location information may be executed or implemented by the LBS server.

In an embodiment of the present invention, the sending module sends the location information of a client to a device for providing services based on the location information, and then the receiving module receives group services provided by a device for providing services based on the location information according to the attribute information of the group of the client. It is ensured that a client receives group services which the client is interested in or demands only within the group service region. Consequently, the pertinence and efficiency of the LBS server for providing the group service to a client or target side are improved. The client may receive different group services after logging into different groups, so that it is convenient and fast for a client to acquire group services and the user experience of a user is greatly improved.

Figure 11:
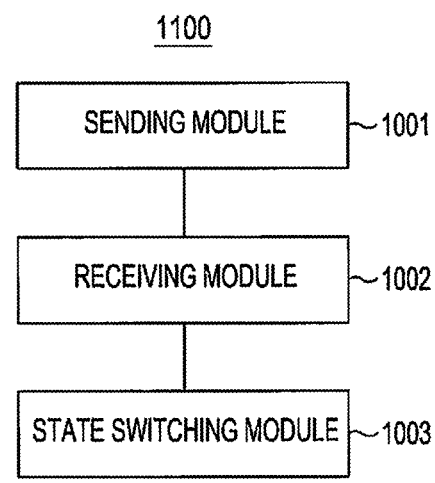
FIG. 11 is a block diagram of a terminal device according to an embodiment of the present invention.

FIG. 11 is a block diagram of a terminal device 1100 according to an embodiment of the present invention.

Referring to FIG. 11, the terminal device 1000 of FIG. 10 further comprises a state switching module 1003 configured to switch the state of a client in a group. The state of a client comprises at least two of the following states: Active, Inactive and Cloaked.

Further, the sending module 1001 is further configured to send information to other clients in the group, and the receiving module 1002 is further configured to receive information sent by other clients in the group, so that the clients in the group may perform information interaction with each other.

The invention further provides a location information based service provision system, comprising a client, an LBS server, an intelligent gateway and an LBS service provider. The specific structure of the location information based service provision system may refer to FIG. 3. The LBS server comprises the device for providing services based on the location information according to any one of the above embodiments of the present invention, wherein the device for providing services based on the location information comprises an acquisition module 801, a retrieval module 802 and a service provision module 803, wherein the acquisition module 801 is configured to acquire location information of a client; the retrieval module 802 is configured to retrieve attribute information of a group of the client when the client is located within a group service region; and the service provision module 803 is configured to provide a group service according to the attribute information of the group of the client, wherein the acquisition module 801, the retrieval module 802 and the service provision module 803 may be disposed in an LBS server so that the LBS server has functions of all of the above modules.

In an embodiment of the present invention, the acquisition module in the LBS server initially acquires the location information of a client. Then, the retrieval module retrieves attribute information of a group of the client when the client is located within the group service region. Finally, the service provision module provides a group service to the client according to the attribute information of the group of the client. It is ensured that a client receives group services which the client is interested in or demands only within the group service region. Consequently, the pertinence and efficiency of the LBS server for providing the group service to a client or target side are improved. The client may receive different group services after logging into different groups, so that it is convenient and fast for a client to acquire group services and the user experience of a user is greatly improved.

A person skilled in the art can understand that the present invention may involve devices for carrying out one or more of the operations as described in the present disclosure. The devices can be specially designed and manufactured as required, or can include well known equipment in a general-purpose computer which stores programs that are selectively activated or reconstructed. Computer programs as such can be stored in device (such as non-transitory computer) readable media or in any type of medium suitable for storing electronic signaling and respectively coupled to a bus, the non-transitory computer readable medium includes but is not limited to any type of disk (including floppy disk, hard disk, optical disk, Compact Disc Read Only Memory (CD-ROM), and magneto optical disk), Random Access Memory (RAM), Read Only Memory (ROM), Electrically Programmable ROM (EPROM), Electrically Erasable ROM (EEROM), Electrically Erasable Programmable ROM (EEPROM), flash memory, magnetic card or optical line card. Readable media include any mechanism for storing or transmitting information in a device (for example, computer) readable form. For instance, readable media include RAM, ROM, magnetic disk storage medium, optical storage medium, flash memory apparatus, signals (such as carriers, infrared signals, digital signals) that travel in an electrical, optical, acoustic, or other form.

It should be understood by a person skilled in the art that computer program instructions can be used to realize these structural diagrams and/or each block in block diagrams and/or flow charts as well as a combination of these structural diagrams and/or blocks in the block diagrams and/or flow diagrams. These computer program instructions can be provided to general purpose computers, special purpose computers or other processors of programmable data processing means to produce a machine, so that the instructions are executed by the computers or the processors of programmable data processing means to create a designated method for effecting the structural diagram and/or a block or blocks of block diagrams and/or flow diagrams.

A person skilled in the art can understand that the operations, the methods, the steps in the flows, the measures, or the schemes discussed in the present invention can be replaced, changed, combined or deleted. Further, the operations, the methods, the other steps in the flows, the measures, or the schemes discussed in the present invention can also be replaced, changed, rearranged, combined or deleted. Further, related arts having the operations, the methods, the other steps in the flows, the measures, or the schemes discussed in the present invention can also be replaced, changed, rearranged, combined or deleted.

The descriptions hereinabove are only part of embodiments of the present invention. It should be pointed out that to a person skilled in the art, under the circumstance without deviating from the scope and spirit of the present invention, he can also make several improvements and modifications, where these improvements and modifications should also be deemed falling within the scope and spirit of the present invention, as defined by the appended claims and their equivalents.

What is claimed is:

1. A method of providing services by a server based on location information, comprising:

creating a group, and setting attribute information of the group by the server, wherein the group corresponds to a group service among a plurality of group services of a plurality of service providers which is integrally provided through a communication network by the server;

receiving, by the server, registration information for joining the group from a terminal device of a client;

receiving, by the server, location information of the client from the terminal device;

identifying, by the server, whether the client is located within a group service region related to the group based on the received location information of the client;

retrieving, by the server, the attribute information of the group in response to identifying that the client is located within the group service region;

providing, by the server, the group service from a service provider among the plurality of service providers, according to the attribute information of the group;

receiving, by the server, a request to change the attribute information of the group from the terminal device; and changing the attribute information of the group based on at least one of a credit rating of the group, a number of login times and login time of each client in the group in response to receiving the request to change the attribute information of the group, wherein the attribute information includes at least one of a provider of the group service, a type of a service of the group service, service frequency of the group service and service time of the group service.

2. The method of providing services based on the location information according to claim 1, wherein providing the group service according to the attribute information of the group comprises providing the group service corresponding to the attribute information of the group to the terminal device.

3. The method of providing services based on the location information according to claim 2, wherein providing the group service corresponding to the attribute information of the group to the terminal device comprises sending notification information to the terminal device when the client enters and/or leaves the group service region.

4. The method of providing services based on the location information according to claim 1, wherein providing the group service according to the attribute information of the group comprises providing the group service corresponding to the attribute information of the group to the client.

5. The method of providing services based on the location information according to claim 1, wherein providing the group service according to the attribute information of the group comprises providing a service of information interaction between clients in the group when the client is located within the group service region.

6. The method of providing services based on the location information according to claim 1, further comprising ceasing to provide the group service to the client when the client leaves the group service region.

7. The method of providing services based on the location information according to claim 1, wherein setting the attribute information of the group comprises at least one of the following: setting cancellation rules of the group; setting qualifications of clients in the group; and setting service items in the group.

8. A server for providing services based on location information, comprising:

a creating module configured to create a group, wherein the group corresponds to a group service among a plurality of group services of a plurality of service providers which is integrally provided through a communication network by the server;

a setting module configured to set attribute information of the group;

an acquisition module configured to receive registration information for joining the group from a terminal device of a client and to receive location information of the client from the terminal device;

a retrieval module configured to retrieve the attribute information of the group when the client being located within a group service region related to the group is identified based on the received location information of the client; and a service provision module configured to provide the group service from a service provider among the plurality of service providers, according to the attribute information of the group, wherein the setting module is further configured to change the attribute information of the group based on at least one of a credit rating of the group, a number of login times and login time of each client in the group in response to receiving a request to change the attribute information of the group, and wherein the attribute information includes at least one of a provider of the group service, a type of a service of the group service, service frequency of the group service and service time of the group service.

9. The server for providing services based on the location information according to claim 8, wherein the service provision module is further configured to provide the group service corresponding to the attribute information of the group to the terminal device according to the attribute information of the group.

10. The server for providing services based on the location information according to claim 9, wherein the service provision module is further configured to send notification information to the terminal device when the client enters and/or leaves the group service region.

11. The server for providing services based on the location information according to claim 9, wherein the service provision module is further configured to provide a service of information interaction between clients in the group when the client is located within the group service region.

12. The server for providing services based on the location information according to claim 8, wherein the service provision module is further configured to provide the group service corresponding to the attribute information of the group to the client.

13. The server for providing services based on the location information according to claim 8, wherein the service provision module is further configured to stop providing the group service to the client when the client leaves the group service region.

14. The server for providing services based on the location information according to claim 8, wherein setting the group information of the group comprises at least one of the following: setting cancellation rules of the group; setting qualifications of clients in the group; and setting service items in the group.

15. A terminal device, comprising:
a sending module configured to send registration information, to a server for providing services, for joining a group created by the server, and send location information of a client of the terminal device to the server, wherein the group corresponds to a group service among a plurality of group services of a plurality of service providers which is integrally provided through a communication network by the server; and
a receiving module, configured to receive the group service provided by a service provider among the plurality of service providers, through the server based on the location information according to attribution information of the group;
wherein, when the server identifies, based on the location information, that the client is located within a group service region related to the group, the server retrieves the attribution information of the group,
wherein the sending module is further configured to send a request to change the attribute information of the group to the server,
wherein the attribute information of the group is changed by the server based on at least one of a credit rating of the group, a number of login times and login time of each client in the group, and
wherein the attribute information includes at least one of a provider of the group service, a type of a service of the group service, service frequency of the group service and service time of the group service.

16. The terminal device according to claim 15, wherein the terminal device further comprises: a status switching module configured to switch a login state of the client in the group; wherein the login state comprises at least two of an active state, an inactive state and an cloaked state.

17. The terminal device according to claim 15, wherein the sending module is further configured to send information to other clients in the group; and the receiving module is further configured to receive information sent by the other clients in the group.

18. A method for receiving services by a terminal device based on location information, comprising:
sending registration information, to a server for providing services, for joining a group created by the server, wherein the group corresponds to a group service among a plurality of group services of a plurality of service providers which is integrally provided through a communication network by the server;
sending location information of a client of the terminal device to the server;
receiving the group service provided by a service provider among the plurality of service providers, through the server based on the location information according to attribution information of the group; and
sending a request to change the attribute information of the group to the server,
wherein the attribute information of the group is changed by the server based on at least one of a credit rating of the group, a number of login times and login time of each client in the group,
wherein, when the server identifies, based on the location information, that the client is located within a group service region related to the group, the server retrieves the attribution information of the group, and
wherein the attribute information includes at least one of a provider of the group service, a type of a service of the group service, service frequency of the group service and service time of the group service.

* * * * *